No. 837,414. PATENTED DEC. 4, 1906.
C. S. LOCKWOOD.
RENEWABLE AUTOMOBILE BEARING.
APPLICATION FILED MAR. 2, 1905.
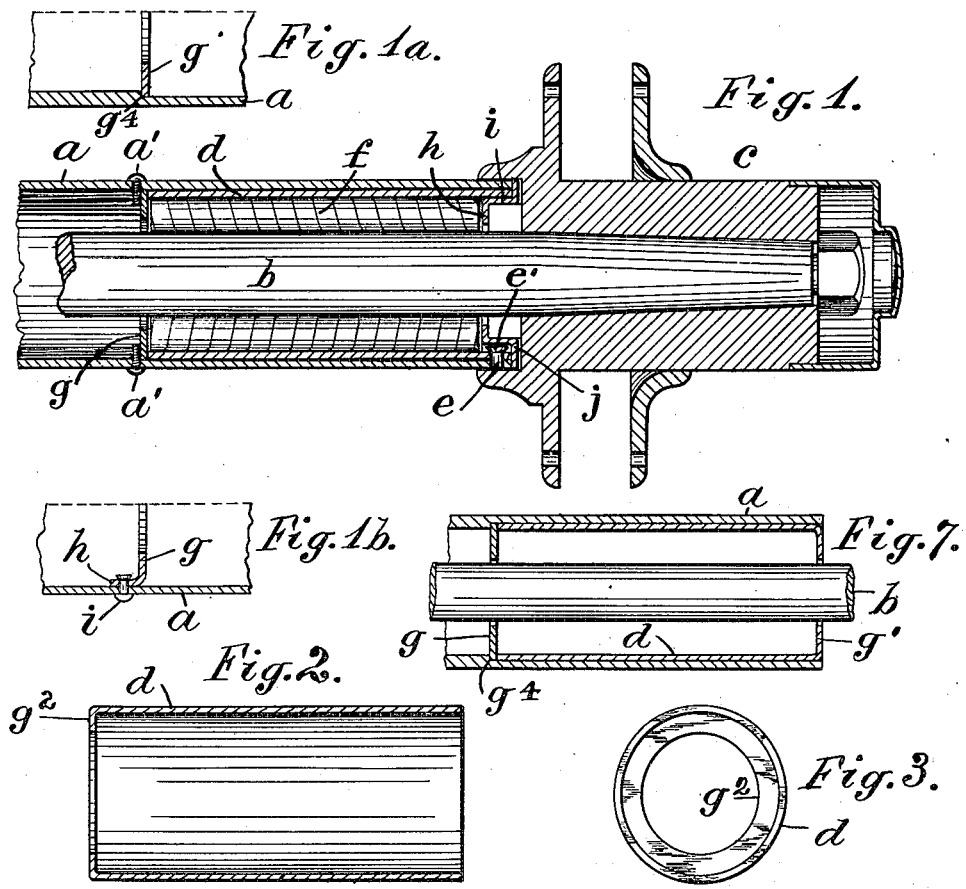
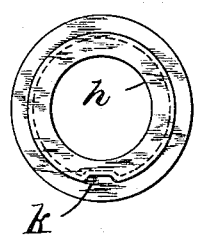
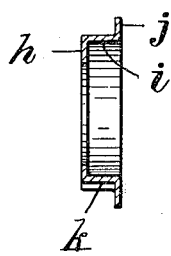
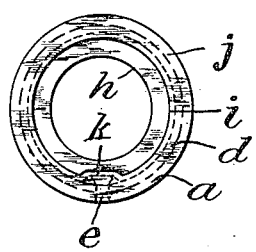
Attest:
Inventor.
Charles S. Lockwood, per
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

RENEWABLE AUTOMOBILE-BEARING.

No. 837,414.      Specification of Letters Patent.      Patented Dec. 4, 1906.

Application filed March 2, 1905. Serial No. 248,038.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Renewable Automobile - Bearings, fully described and represented in the following specification and the accompanying drawings, forming a part of the same.

The present invention relates to a roller-bearing for the rear axle of an automobile, in which a stationary bearing-tube is commonly supported upon the frame of a carriage and the axle rotated by the power within the same. By applying antifriction-rolls between the axle and the bearing-tube the friction of the movement is materially reduced; but the wear upon the bearing-tube ultimately prevents the rolls from operating properly and the bearing-tube must, therefore, be renewed unless a detachable lining-sleeve be provided to sustain such wear.

The object of the present invention is to furnish an economical construction for such a detachable sleeve by which it may be readily secured within the bearing-tube and readily withdrawn and replaced in case of necessity.

In the present invention the sleeve is inserted in the outer end of the tube and the tube and sleeve provided with coincident perforations close to the outer end, in which a stud or loose rivet may be inserted to hold the lining in position while in use.

A collar is provided to contact with the outer ends of the antifriction-rolls, and such collar may be utilized to hold the stud or rivet in the perforations. Whenever it is necessary to renew the lining, the removal of the collar permits the stud to be taken from the perforations and the lining to be withdrawn from the tube. The lining may be formed with a collar at the inner end to hold the rolls therein, or a collar may be inserted in the tube and held in position by projections or studs upon the tube, and the collar at the outer end of the bearing may be provided with a socket to retain a packing which lies between the antifriction-rolls and the wheel-hub and prevents the intrusion of dirt into the bearing.

The invention will be understood by reference to the annexed drawings, in which—

Figure 1 is a longitudinal section, where hatched, of a bearing provided with the improvements. Fig. 1$^a$ and Fig. 1$^b$ show alternative constructions for the inner collar, each view showing the half below the center line only. Fig. 2 is a longitudinal section of the sleeve with integral collar at the inner end. Fig. 3 is an end view of the same. Fig. 4 shows the inner end of the socketed collar. Fig. 5 is a section of the same, and Fig. 6 the outer end of the bearing with the packing removed from the socket. Fig. 7 shows a reverse arrangement for the collared lining-sleeve.

$a$ designates the bearing-tube, which in practice is held stationary.

$b$ is the axle, having the wheel-hub $c$ secured removably upon the outer end. The removable lining-sleeve $d$ is shown inserted in the outer end of the bearing-tube, and a rivet $e$, having head $e'$, is shown inserted through perforations in the sleeve and tube close to the outer end. Antifriction-rolls $f$ are shown between the axle and the sleeve, and a separate collar $g$ is shown in Fig. 1 inserted in the tube between the inner end of the sleeve and two studs $a'$, which are secured in holes in the tube to hold the collar in place. An outer collar $h$ is shown formed with a cylindrical socket or chamber $i$, which is fitted to the inside of the lining $d$ and is provided at the outer end with a flange $j$, which laps over the ends of the lining and tube.

One side of the socket is indented to form a recess $k$, (shown in Fig. 4) which fits over the head $e'$ of the stud or rivet $e$ and holds it immovably so long as the collar is in place, as shown in Fig. 6. The socket, as shown in Fig. 1, serves to receive a charge of fibrous packing $l$, which prevents the access of dust and dirt to the interior of the sleeve and the antifriction-rolls. When the wheel is removed from the outer end of the axle, the socketed collar $h$ $i$ $j$ can be removed from the sleeve, which permits the rolls to be inspected or replaced, and the rivet $e$ can then be withdrawn from the perforations in the tube and sleeve and the sleeve replaced, if desired. The perforation in the outer end of the sleeve is of great use in withdrawing the sleeve from the interior of the tube, as a hooked tool can be engaged with the perforation to pull the sleeve out of the tube.

Fig. 1ª shows an alternative construction for supporting the collar $g$ in the bearing-tube by boring for a suitable depth to receive the sleeve $d$ and the collar $g$, which is thus held in place by the shoulder $g'$ at the bottom of the bored recess. Fig. 1ᵇ shows another construction in which the collar $g$ is formed with a flange $h$, secured within the bearing-tube by rivets $i$.

Fig. 2 shows the sleeve with an integral collar $g^2$ upon its inner end, which serves the same purpose as the separate collar $g$ in Fig. 1, but involves a more expensive form of sleeve than the straight tubular sleeve shown in Fig. 1. This form of sleeve may be used without the detachable collar $h$ at the outer end of the bearing by reversing the separate collar $g$ and the sleeve within the bearing-tube, as shown in Fig. 7, the collar $g'$ then serving to retain the rolls in the bearing in place of the collar $h$. This construction can be used with or without a packing between the outer collar and the wheel-hub; but the outer collar is shown even with the end of the bearing-tube in Fig. 7, so as to be held within the same by contact with the wheel-hub.

From the above description it will be seen that the invention consists, broadly, of the combination, with the stationary bearing-tube, of the detachable lining-sleeve having collar at the inner end and held from longitudinal movement within the bearing-tube by detachable means which permit it to be withdrawn and replaced whenever necessary.

Having thus set forth the nature of the invention, what is claimed herein is—

1. In an automobile-wheel bearing, the combination, with the stationary bearing-tube $a$, of the axle $b$ rotatable therein and projected from one end of the same with the wheel-hub $c$ secured detachably upon the projecting end of the axle, the lining-sleeve $d$ fitted detachably in the end of the bearing-tube, the collars $d$ and $e$ fitted within the tube at opposite ends of the sleeve with anti-friction-rolls $f$ fitted between the same, and the wheel-hub $c$ and the outer collar $e$ being detachable from the sleeve and tube to permit inspection of the rolls, substantially as herein set forth.

2. In an automobile-wheel bearing, the combination, with the stationary bearing-tube $a$, of the axle $b$ rotatable therein and projected from one end of the same with the wheel-hub $c$ secured detachably upon the projecting end of the axle, the lining-sleeve $d$ fitted detachably in the end of the bearing-tube, the tube and sleeve having coincident perforations near the outer end, the stud $h$ held removably in such perforations, the collars $d$ and $e$ at the opposite ends of the tube with antifriction-rolls $f$ fitted between the same, and the wheel-hub $c$ and the outer collar $e$ being detachable to permit inspection of the rolls, substantially as herein set forth.

3. In an automobile-bearing, the combination, with the stationary bearing-tube and the axle rotated therein, of the detachable lining-sleeve $d$, the tube and sleeve having coincident perforations, a stud held removably in such perforations, a collar held removably at the outer end of the tube and sleeve, and a separate collar fitted to the inner end of the sleeve within the tube, and projections upon the tube holding such inner collar in place.

4. In an automobile-bearing, the combination, with the stationary bearing-tube and the axle rotated therein, of the detachable lining-sleeve $d$, the tube and sleeve having coincident perforations, a stud held removably in such perforations, a collar at the inner end of the sleeve to retain the rolls therein, and a socketed collar at the outer end of the tube and sleeve to hold the rolls therein and provided with packing in the socket, as and for the purpose set forth.

5. In an automobile-bearing, the combination, with the stationary bearing-tube and the axle rotated therein, of the detachable lining-sleeve $d$, the tube and sleeve having coincident perforations, a stud inserted in the perforations and provided upon the inner end with a head, a socketed collar fitted to the outer end of the tube and sleeve and formed with recess to engage the head of the stud, and the inner end of the sleeve being provided with a collar to hold the rolls within the sleeve.

6. The combination of the stationary bearing-tube, the axle rotated therein, the detachable sleeve within the outer end of the tube, the sleeve and tube having coincident perforations near the outer end, a stud $e$ inserted in the perforations having a head upon the inner end, and the collar $j$ having the cylindrical socket formed thereon with the flange $h$ fitted at the outer end of the tube and sleeve and the recess $k$ in the outer side of the socket to engage the head $e'$ of the stud, whereby the removal of the socketed collar permits the removal of the stud and the withdrawal of the sleeve from the tube.

In testimony whereof I have hereunto set my hand in the presence of two subscribing witnesses.

CHARLES S. LOCKWOOD.

Witnesses:
ALFRED SLOAN, Jr.,
THOMAS S. CRANE.